United States Patent [19]

Nakanishi

[11] Patent Number: 5,343,259
[45] Date of Patent: * Aug. 30, 1994

[54] GLASSES

[75] Inventor: Eiichi Nakanishi, Ashiya, Japan

[73] Assignee: Nakanishi Optical Co., Ltd., Osaka, Japan

[ * ] Notice: The portion of the term of this patent subsequent to Aug. 27, 2008 has been disclaimed.

[21] Appl. No.: 768,360

[22] Filed: Sep. 30, 1991

Related U.S. Application Data

[63] Continuation of Ser. No. 409,092, Sep. 19, 1989, abandoned, which is a continuation of Ser. No. 328,816, Feb. 24, 1989, abandoned, which is a continuation of Ser. No. 96,409, Sep. 15, 1987, abandoned.

[30] Foreign Application Priority Data

Oct. 2, 1986 [JP] Japan .................. 61-151945[U]

[51] Int. Cl.⁵ .................................................. G02C 5/02
[52] U.S. Cl. ............................................ 351/124; 351/41
[58] Field of Search ........................ 351/41, 90–102, 351/104, 124, 140, 144, 133

[56] References Cited

U.S. PATENT DOCUMENTS

| | | |
|---|---|---|
| 440,064 | 11/1890 | Schneiber . |
| 989,218 | 4/1911 | Wells . |
| 1,457,608 | 6/1923 | Schumacher . |
| 1,461,071 | 7/1923 | Schumacher . |
| 1,479,936 | 1/1924 | Stevens . |
| 1,613,202 | 1/1927 | Schumacher . |
| 1,637,029 | 7/1927 | Schumacher . |
| 1,700,573 | 1/1929 | Siddall . |
| 2,169,235 | 8/1939 | Foster . |
| 2,192,208 | 3/1940 | Stevens . |
| 2,261,525 | 9/1943 | Rips . |
| 2,379,928 | 7/1945 | Rosenheim . |
| 2,412,076 | 12/1946 | Bouchard . |
| 3,304,145 | 2/1967 | Hamm .................. 351/140 |
| 4,772,112 | 9/1988 | Zider et al. . |
| 4,896,955 | 1/1990 | Zider et al. . |
| 5,042,934 | 8/1991 | Nakanishi .................. 351/124 |

FOREIGN PATENT DOCUMENTS

| | | |
|---|---|---|
| 3503644 | 4/1986 | Fed. Rep. of Germany ...... 351/140 |
| 536688 | 5/1922 | France . |
| 63-214716 | 9/1988 | Japan . |

Primary Examiner—Bruce Y. Arnold
Assistant Examiner—Hung Xuan Dang
Attorney, Agent, or Firm—Edgar H. Haug

[57] ABSTRACT

A glasses with bridges and temples which are fixed to lens frames, without depending upon deposition. Bridges and temples of this glasses can be changed easily according to one's taste because they are not deposited to lens frames but are fixed to lens frames through the medium of sleeves and other means.

5 Claims, 3 Drawing Sheets

GLASSES

This application is a continuation of application Ser. No. 07/409,092, filed Sep. 19, 1989, now abandoned which is a continuation of application Ser. No. 07/328.816, filed Feb. 24, 1989, now abandoned which is a continuation of application Ser. No. 07/096,409, filed Sep. 15, 1987, now abandoned.

BACKGROUND OF THE INVENTION

1. Field of the Invention

This invention relates to glasses with parts, such as a bridge between two lens frames, temples, etc., which can be fixed firmly, without depending upon the materials themselves for attachment.

2. Prior art

In the conventional glasses, two lens frames with the required space left therebetween are connected by one or two bridges and each of the temples is fixed foldably to an end piece provided at the outer side of lens frames. These lens frames, bridges, end pieces, etc. are fixed together by welding.

With the development of high-fashioned glasses in recent years, in some cases each part of the glasses is made of different materials. However, in making each part of glasses with different materials, it is required that such materials must be welded to each other and therefore materials which cannot be welded are not usable even if they are excellent in quality and designability.

The present invention has for its object to provide glasses with parts which are fixable to each other, irrespective of whether their materials are weldable or not.

SUMMARY OF THE INVENTION

Glasses according to the present invention comprises two lens frames, two lenses, two temples, sleeves and end pieces, of which at least the lens frames, sleeves and end pieces are formed with weldable materials. The two lens frames have sleeves at the upper part and the inner side thereof. A bridge and a U-shaped bridge are laid between and fixed to the opposite sleeves. A base end portion of each temple is fitted in and fixed to a sleeve provided at an end of an end piece. Thus, parts formed with materials which cannot be welded are fixable, without depending upon welding.

BRIEF DESCRIPTION OF THE DRAWINGS

The drawings show an embodiment of the glasses according to the present invention, in which.

DETAILED DESCRIPTION OF THE INVENTION

Figure 1:
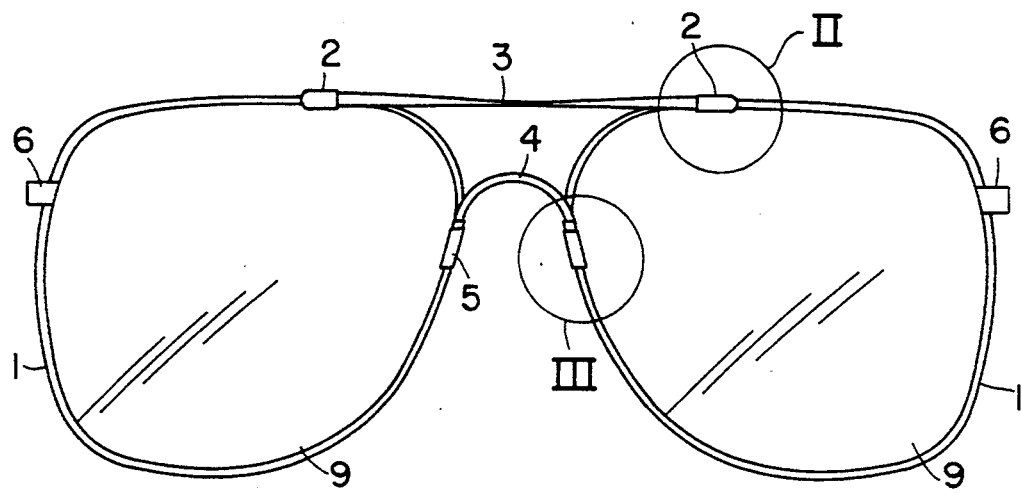
FIG. 1 is a front view of the whole glasses according to the present invention.
Figure 2A:
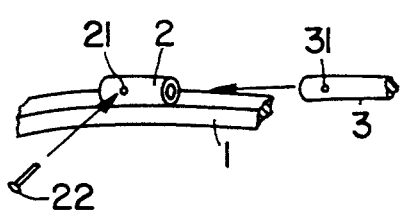
FIG. 2A-2D is an explanatory drawing showing a method of fixing together a bridge and a sleeve.
Figure 2B:
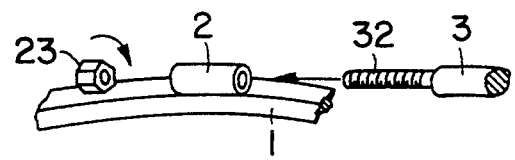
Figure 2C:
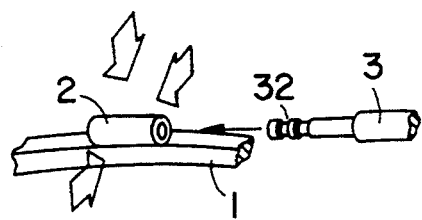
Figure 2D:
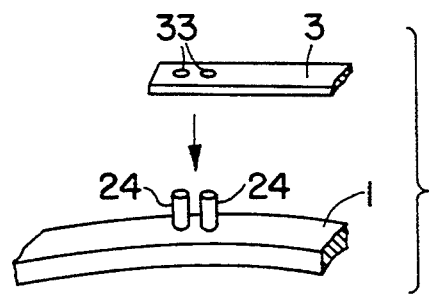

A description is given below of the glasses according to the present invention on the basis of an embodiment shown in the drawing.

In the drawing, numerals 1 designate two lens frames. The shape of the lens frame 1 is not limited to that shown in FIG. 1 but any shape and any design can be adopted for the lens frame. The desired lens 9 is set in each lens frame 1. Numeral 2 designates a hollow sleeve welded to the upper part of each lens frame 1. These sleeves 2 are provided on each lens frame 1 in such a fashion that they oppose each other. An upper bridge element 3 is of either cylinder form or pipe form and both ends thereof are fixed in each sleeve 2. As shown in FIG. 2, an end portion 32 of the bridge element 3 is fitted in the sleeve 2 and then the sleeve 2 is pressed from outside to deform it for holding the end portion 32 in the sleeve 2.

Figure 3A:
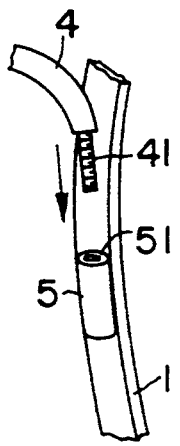
FIG. 3(A) to (D), are explanatory drawings showing different methods of fixing U-shaped bridge.
Figure 3B:
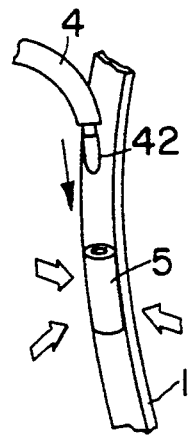
Figure 3C:
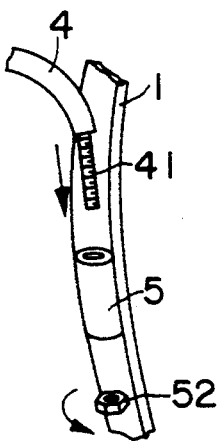
Figure 3D:
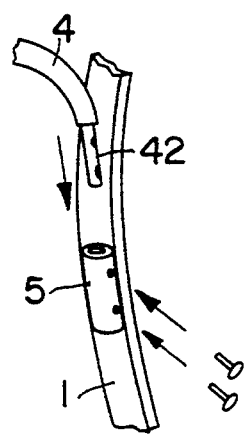

A nose bridge element 4 of U-shaped curve to be laid between two lens frames 1, 1 are fixed to the lens frames as shown in FIG. 3(A) and 3(B). As to the method of fixing shown in FIG. 3(A), a bolt 41 provided at the top end of the U-shaped nose bridge element 4 is fitted in the sleeve 5 and then the sleeve 5 is pressed from the outside to deform it for fixing the bolt 41 in sleeve 5. With regard to the method of fixing shown in FIG. 3(B), a fitting rod provided at the top end of the U-shaped nose bridge element 4 is fitted in the sleeve 5 and a top end of the bolt 41 projecting from the sleeve 5 is held with a nut 52.

Figure 4A:
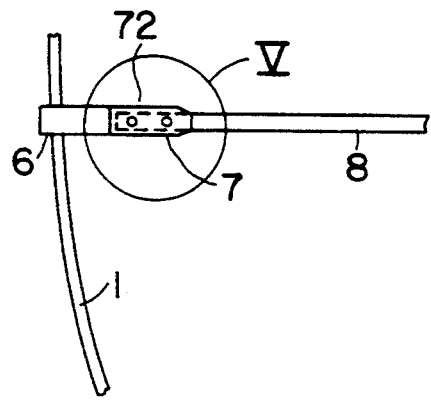
FIG. 4A and 4B is a side view of the temple fixing portion.
Figure 4B:
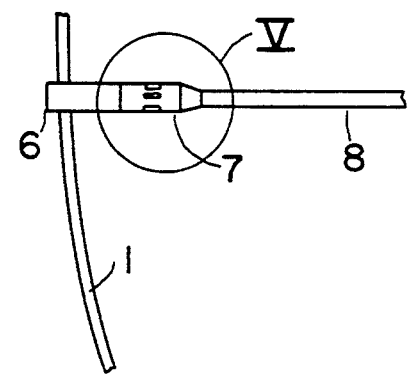
Figure 5A:
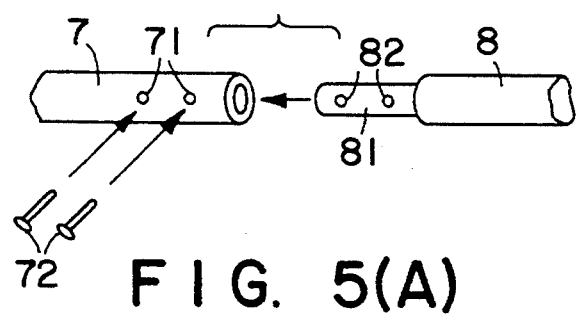
FIG. 5A and 5B exploded view of the structure of FIG. 4.
Figure 5B:
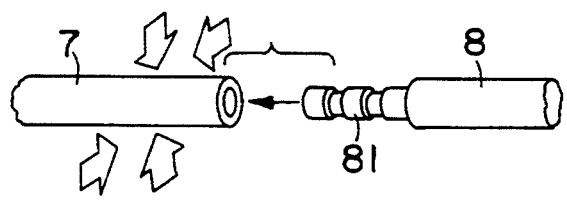

As to the fitting of a temple 8, as shown in FIG. 4, a sleeve 7 is provided at the outer end of an end piece 6. After a base end 81 of the temple 8 is inserted in the sleeve 7, the sleeve 7 is pressed from the outside to deform it for fixing the temple therein.

The lens frame 1 and the sleeve 2, 5/end piece 6 may be made of different material but should be made of material which can be welded to each other. The sleeves 2, 5, 7 are fixed beforehand to the lens frame 1, and the bridge elements 3, 4 and the temples 8 are fixed to these sleeves. Therefore, the bridge elements and the temples may be made of either weldable material or material which cannot be welded.

According to the present invention, at least lens frames 1, sleeves and end pieces are formed with weldable material, sleeves are provided at the upper part and at the inner side of two lens frames, a bridge element and a U-shaped nose bridge element are laid between opposite sleeves, the bridge elements and the sleeves are fixed together, and a base end of the temple is fitted in and fixed to a sleeve provided at an end of an end piece. Thus, fixation between parts, such as lens frame, bridge elements, temple, etc., can be done accurately, even in the case where parts cannot be welded to each other. Moreover, temples and bridge elements can be changed easily according to one's taste.

What is claimed is:

1. A frame for glasses, comprising:

two lens frames side by side each having a bridge element receiving sleeve integrally secured directly to the top thereof, said lens frames and said receiving sleeves being of materials which can be integrally joined by welding;

an upper bridge element of a material other than a material which can be joined to said lens frames by welding;

said upper bridge element extending between the two bridge element receiving sleeves with the ends of the upper bridge element within the bridge element receiving sleeves and the bridge element receiving sleeves being deformed for securing the ends of the upper bridge element therein.

2. A frame for glasses, comprising:

two lens frames side by side each having an end piece on the outer portion of said lens frames and said end piece having a temple receiving sleeve directly pivotally mounted thereon, said end pieces being of materials which can be integrally joined by welding;

a pair of temples, each being of a material other than a material which can be joined to said lens frames by welding; and each temple having a forward end engaged in a corresponding temple receiving sleeve with the temple receiving sleeve being deformed for securing the end of the temple therein.

3. A method of making a frame for glasses, comprising:

providing two lens frames in side by side relationship;

integrally securing a bridge element receiving sleeve of a material which can be welded to said lens frames directly to the top of each of said lens frames by welding;

integrally securing a nose bridge element receiving sleeve of a material which can be welded to the lens frames to the inner portion of each of said lens frames where the lens frames are in spaced opposed relation by welding;

integrally securing an end piece of a material which can be welded directly to the lens frames to the outer portion of each of said lens frames on the opposite side thereof from the nose bridge element receiving sleeve by welding, each end piece having a temple receiving sleeve pivotally mounted thereon;

inserting the opposite ends of an upper bridge element of a material other than a material which ban be joined to said lens frames by welding into the bridge element receiving sleeves so that the bridge element extends between the bridge element receiving sleeves, and deforming the bridge element receiving sleeves for retaining the ends the bridge element therein;

inserting the opposite ends of a nose bridge element of a material other than a material which can be jointed to said lens frames by welding into the nose bridge element receiving sleeves so that the nose bridge elements extends between the nose bridge element receiving sleeves for retaining the ends of the nose bridge element therein; and inserting the forward end of a temple of a material other than a material which can be jointed to said lens frames by welding into each of the temple receiving sleeves and deforming the temple receiving sleeves for retaining the ends of the temples therein.

4. A method of making a frame for glasses, comprising:

providing two lens frames in side by side relationship;

integrally securing a nose bridge element receiving sleeve of a material which can be welded directly to said lens frames to the top of each of said lens frames by welding; and inserting the opposite ends of a nose bridge element of a material other than a material which can be joined to said lens frames by welding into the bridge element receiving sleeves so that the bridge element extends between the bridge element receiving sleeves, and deforming the bridge element receiving sleeves for retaining the ends of the bridge element therein.

5. A method of making a frame for glasses, comprising:

providing two lens frames in side by side relationship;

integrally securing an end piece of a material which can be welded to the lens frames to the outer portion of each of said lens frames on the opposite side thereof from the nose bridge element receiving sleeve by welding, each end piece having a temple receiving sleeve directly pivotally mounted thereon; and inserting the forward end of a temple of a material other than a material which can be joined to said lens frames by welding into each of the temple receiving sleeves and deforming the temple receiving sleeves for retaining the ends of the temples therein.

* * * * *